United States Patent [19]

Abe et al.

[11] 3,862,006

[45] Jan. 21, 1975

[54] PROCESS FOR PRODUCING YEAST CELLS

[75] Inventors: Shigeo Abe; Yasuharu Yokote, both of Tokyo, Japan

[73] Assignee: Kyowa Hakko Kogyo Kabushiki Kaisha, Tokyo-to, Japan

[22] Filed: Dec. 27, 1972

[21] Appl. No.: 318,943

[30] Foreign Application Priority Data
Dec. 28, 1971 Japan................................ 46-105677

[52] U.S. Cl....................................... 195/49, 195/82
[51] Int. Cl........................... C12d 1/00, C12b 1/00
[58] Field of Search.................... 195/37, 49, 31, 82

[56] References Cited

UNITED STATES PATENTS

| | | | |
|---|---|---|---|
| 3,563,857 | 2/1971 | Oki et al. | 195/49 |
| 3,622,456 | 11/1971 | Onishi et al. | 195/49 |
| 3,681,200 | 8/1972 | Ridgway | 195/49 |

*Primary Examiner*—Alvin E. Tanenholtz
*Assistant Examiner*—Thomas G. Wiseman
*Attorney, Agent, or Firm*—Wolder & Gross

[57] ABSTRACT

The present invention relates to a process for producing yeast cells by culturing a microorganism of *Torulopsis methanosorbosa nov. sp.*

6 Claims, No Drawings

PROCESS FOR PRODUCING YEAST CELLS

DESCRIPTION

Carbon sources conventionally used for fermentation have been derived mainly from agricultural products. Meanwhile, fermentation processes using hydrocarbons such as kerosene, naphtha, light oil and various n-paraffins for the growth of microorganism have also been studied in order to solve the foodstuff problem, i.e., shortage of food expected in the near future. Difficulty has been encountered in obtaining excellent strains capable of assimilating hydrocarbons. Additionally, various problems exist with respect to the apparatus to be used, such as, for example, the need for a great deal of power for the vigorous agitation necessary for promoting the assimilation of hardly water soluble hydrocarbons by means of microorganism; as well as cooling problems due to the large thermal energy generated during culturing. From a practical viewpoint, there are also other difficulties, such as the treatment of the toxic substances, e.g., cancer inducers, contained in petroleum, hydrocarbons and fermentation waste liquor.

It is desirable to produce yeast cells using as the main carbon source methanol since it can be obtained in large quantities at a low cost by chemical industry. In accordance with the present invention, a yeast having an excellent methanol assimilability and suitable for the large scale production of yeast cells has been found.

The present invention broadly comprises a process for producing yeast cells by culturing a new strain having an excellent methanol-assimilability, designated *Torulopsis methanosorbosa* in a culture medium containing methanol as the main carbon source. In particular, the present invention comprises a process for producing yeast cells with a high yield by culturing said yeast in a culture medium containing methanol as the main carbon source in the presence of at least one member selected from the group consisting of thiamine and salts thereof, p-aminobenzoic acid and salts thereof, folic acid and salts thereof, riboflavin, biotin, inositol and calcium ion.

Known yeasts capable of assimilating methanol are less common than bacteria having such an assimilability. It has been reported that yeasts capable of assimilating methanol include three strains of Candida (French Pat. No. 2,006,235; Summary of Lectures at the Meeting of Japanese Agricultural Chemistry in 1970, pages 344–345), two strains of Pichia and one strain of Hansenula (French Pat. No. 2,006,235), one strain of Kloeckera (Agricultural Biological Chemistry, 33, 1519 (1969)) and one strain of Torulopsis (Summary of Lectures at The Meeting of Japanese Agricultural Chemistry in 1970, page 344).

*Torulopsis methanosorbosa* which may be used for the purpose of the present invention is superior to the above noted known yeasts with respect to the yield of cells to methanol and specific growth rate ($\mu$). Furthermore, the maximum growth temperature and optimum growth temperature of the present yeast are 43° C and 37° C, respectively. Accordingly the present yeast is characterized by a higher growth temperature when compared with usual conventional yeasts.

In the culturing of microorganism, the cooling of fermentation heat is an important problem regarding cooling water and cooling apparatus, etc. Higher culturing temperature is advantageous for promoting a cooling effect since the difference between culturing temperature and temperature of the cooling water becomes larger, and furthermore the fermentation is accelerated at a high temperature.

The advantage achieved by the present invention resides in that it is possible to easily obtain yeast cells at a high yield.

*Torulopsis methanosorbosa* KY 12001 (FERM P-No. 1208) (ATCC 20361), used in the practice of the present invention is a type culture of a new species of the genus Torulopsis and is on deposit with and freely available on a non-restricted basis from The Fermentation Research Institute of the Agency of Industrial Technology of Tokyo, Japan, as well as American Type Culture Collection. It has the following microbiological properties:

a. Growth on media:
1. YM liquid medium: good growth when cultured at 25° C for 3 days; compact sediment; no formation of film; size of cell; (2–4) × (1.5 – 4)$\mu$; spherical; propagation by budding
2. YM agar medium: moderate growth when cultured at 25° C; the surface of colony is smooth, white and butter-like; Giant colony is flat or raised, and the edge thereof is slightly undulant.
3. Potato extract agar slant: Cells are all spherical and vegetative. Pseudomycelium, true mycelium, spore, arthrospore, etc., are not observed.

b. Formation of ascospore: not observed c. Formation of ballistospore: not observed d. Physiological properties:
1. Optimum growth condition: pH 5–6; 37° C; aerobic
2. Growth range: pH 3–9; not higher than 43° C
3. Assimilation of nitrate: positive
4. Decomposition of fat: negative
5. Decomposition of urea: negative
6. Decomposition of gelatin: negative
7. Formation of carotenoid: negative
8. Notable formation of organic acid: negative
9. Formation of starch-like substance: negative e. Fermentability of sugar: D-glucose and D-mannose are fermented. Maltose, sucrose, lactose, raffinose, D-galactose and cellobiose are not fermented.

f. Assimilability:
Assimilable: D-glucose, galactose, L-sorbose, trehalose, D-xylose, L-arabinose, L-rhamnose, glycerol, D-mannitol, DL-lactic acid, succinic acid, citric acid, adonitol, D-sorbitol, D-fructose, methanol and ethanol.

Not assimilable: D-ribose, D-arabinose, maltose, surcrose, lactose, melibiose, cellobiose, raffinose, arbutin, soluble starch, innulin, erythritol, inositol, dulcitol, D-gluconic acid, 2-keto-D-gluconic acid, acetic acid and n-paraffins.

g. Capable of assimilating methanol and ethanol as a sole carbon source.

Note: Composition of YM medium: peptone (5g), yeast extract (3 g), malt extract (3 g) and glucose (10 g) are dissolved in water (1,000 ml).

When comparing the above mentioned properties of the present strain with those of known species as disclosed in "The Yeast A Taxonomic Study," J. Lodder et al. (1970) (North-Holland Publishing Co., Amsterdam, London), *Torulopsis nitratophila* is closely related to the present strain. However, there are differences between them with respect to fermentability of galactose, assimilability of sorbose, ribose, lactic acid, succinic acid, citric acid, methanol etc., and the maximum growth temperature, etc. Accordingly, the present strain has been determined to be a new species of the genus Torulopsis and named *Torulopsis methanosorbosa*.

Culturing methods as used with conventional yeasts may in general be applied to the culturing process of the present invention. Liquid culture, especially submerged culture with agitation is most suitable. According to the process of the present invention, it is preferred to carry out the cultivation at a temperature of about 20°–40° C, preferably about 30°–40° C at a pH of about 4–10.

Media which may be used for the purpose of the present invention should contain a carbon source which is capable of being assimilated by the microorganism used (such as methanol, ethanol, sorbose); a nitrogen source, organic and inorganic nitrogen sources (such as urea, ammonia, ammonium sulfate, ammonium nitrate, etc.), a natural nitrogen source (such as corn steep liquor, peptone, meat extract, yeast extract, etc.), various inorganic salts such as phosphates (e.g. potassium dihydrogenphosphate, potassium monohydrogenphosphate, etc.), magnesium sulfate, manganese sulfate, iron sulfate, zinc sulfate, calcium sulfate, etc. and a growth promoting substance.

When methanol is used as the main carbon source, it is possible to obtain yeast cells at a high yield by adding vitamins (such as thiamine hydrochloride, p-aminobenzoic acid, folic acid, riboflavin, biotin, inositol, etc.) and/or calcium-containing compounds (such as calcium chloride, calcium acetate, calcium phosphate, etc.) to the medium.

The concentration of such added vitamins and calcium-containing compounds may vary, depending upon the additive. For example, the concentrations in case of biotin and folic acid range preferably from 10–100 $\gamma/l$ and the concentration in case of thiamine hydrochloride is preferably from 50–1,000 $\gamma/l$; the concentrations in the case of p-aminobenzoic acid, folic acid, riboflavin and inositol is preferably from 100–1,000 $\gamma/l$, and the preferable concentration of calcium chloride, calcium phosphate, etc., is above $10^{-5}$ M/l.

The present invention will be further clearly illustrated by the following examples:

EXAMPLE 1

A base medium was prepared by dissolving methanol (10 ml), NH$_4$Cl (4 g), KH$_2$PO$_4$ (1 g), K$_2$HPO$_4$ (1g) MgSo$_4$. 7H$_2$O (0.5 g) FeSO$_4$. 7H$_2$O (10 mg), MnSO$_4$. 4–6H$_2$O (10 mg) and CaCl$_2$ (0.2 g) in deionized water (1 liter). Culture media were then prepared by separately adding the vitamins shown in Table 1 to samples of the base media obtained. *Torulopsis methanosorbosa* KY 12001 (FERM P-No. 1208) (ATCC 20361) was inoculated to each sample.

The cultivation was carried out at 30° C for 62 hours with shaking to give the strain growth shown in Table 1, wherein the growth degree is expressed by optical density at 660 m$\mu$ determined on a four-time diluted cultured liquor.

Table 1

|  | Amount Added (per liter of sample) | Growth |
| --- | --- | --- |
| Thiaminehydrochloride | 1000 $\gamma/l$ | 0.215 |
| Riboflavin | do. | 0.162 |
| p-Aminobenzoic acid | 200 $\gamma/l$ | 0.175 |
| Folic acid | 10 $\gamma/l$ | 0.157 |
| Biotin | do. | 0.225 |
| Inositol | 1000 $\gamma/l$ | 0.185 |
| No additive |  | 0.134 |

Note: * optical density at 660 m$\mu$

EXAMPLE 2

A similar strain to that used in Example 1 was inoculated to a medium having a composition of methanol (20 ml/l), NH$_4$Cl (4 g/l), KH$_2$PO$_4$ (2 g/l), MgSO$_4$. 7H$_2$O (0.5 g/l), biotin (10 $\gamma/l$), thiamine hydrochloride (1,000 $\gamma/l$) and CaCl$_2$ (5 × $10^{-5}$ M/l). The medium had a pH of 6.0 and was cultured at a temperature of 30° C for 72 hours with shaking.

The growth of the strain at 660 m$\mu$ determined on a four-time diluted culture liquor was 0.92 expressed by optical density. Another culture was carried out in a similar manner to that described above but without the use of CaCl$_2$. It gave a growth of only 0.52 expressed by optical density.

EXAMPLE 3

300 ml of a medium having a composition of NH$_4$Cl (0.4%), KH$_2$PO$_4$ (0.2%), MgSO$_4$. 7H$_2$O (0.05%), CaCl$_2$. 2H$_2$O (0.02%), biotin (10 $\gamma/l$) and thiamine hydrochloride (100 $\gamma/l$) was placed in a 2 liter Erlenmeyer flask and was sterilized at 120° C for 15 minutes. 6 ml of methanol (2% v/v) and 6 g of CaCO$_3$ were than added. *Torulopsis methanosorbosa* KY 12001 (FERM P-No. 1208) (ATCC 20361) was inoculated to the resultant medium and the resultant mixture was cultured at a temperature of 37° C for 48 hours with shaking (220r.p.m.). Hydrochloric acid was added to the cultured liquor to dissolve CaCO$_3$. This liquid was then centrifuged, followed by freeze-drying to give 2.05 g of cells. The crude protein content of the cells obtained was 48.3 percent.

EXAMPLE 4

3 liters of a medium having a composition of (NH$_4$)$_2$SO$_4$ (0.5%), KH$_2$PO$_4$ (0.2%), MgSO$_4$. 7H$_2$O (0.05%) CaCl$_2$. 2H$_2$O (0.2%), FeSO$_4$. 7H$_2$O (10 mg/l), MnSO$_4$. 4–6H$_2$O (10 mg/l), biotin (10 $\gamma/l$) and thiamine hydrochloride (100 $\gamma/l$) was placed in a 5-filter jar fermenter and was sterilized. Methanol (30 ml) was then added.

*Torulopsis methanosorbosa* KY 12001 (FERM P-No. 1208)(ATCC 20361) was inoculated to the resultant medium, and the medium was then cultured for 40 hours at a temperature of 37° C with aeration (3 l/min) and agitation (600 r.p.m.). When the methanol concentration of the medium was reduced to 0.2 percent, methanol was repeatedly added to keep the concentration of at 1 percent during the cultivation. The pH of the culture medium during the cultivation was kept 5.5 by means of aqueous ammonia. The cultured liquor was centrifuged and then freeze-dried to give 36 g of cells.

The methanol evaporated into waste gas was recovered in a trap. Consumed methanol was determined by deducting the amount of methanol recovered from that added. The yield of cells to the consumed methanol was 42 percent (based on weight). Although the specific growth rate varied during the cultivation, the maximum value ($\mu$max) was 0.16 hr$^{-1}$. The crude protein content of the dried cells was 54 percent.

Various modifications may be made to the present invention.

Having described the present invention, that which is sought to be claimed and protected is set forth in the following claims:

1. A process for producing yeast cells which comprises culturing a microorganism belonging to the species *Torulopsis methanosorba* in a culture medium containing methanol as the main carbon source, nitrogen source and inorganic source, and recovering yeast cells therefrom.

2. The process of claim 1 wherein the microorganism is *Torulopsis methanosorbosa* KY 12001 (FERM P-No. 1208)(ATCC 20361).

3. The process of claim 1 wherein the culture medium further contains at least one member selected from the group consisting of thiamine, salts thereof, p-aminobenzoic acid, salts thereof, folic acid, salts thereof, riboflavin, biotin, inositol and calcium ion.

4. The process of claim 3 wherein said calcium ion is calcium chloride.

5. The process of claim 1 wherein methanol is added to the culture medium during cultivation to make up for its depletion during the cultivation process.

6. The process of claim 1 wherein the culturing is effected at a temperature of about 20°–40° C and at a pH of about 4 to 10.

* * * * *